United States Patent
Aman et al.

(10) Patent No.: US 9,453,659 B2
(45) Date of Patent: Sep. 27, 2016

(54) REACTION MATERIAL FORMED BODY AND HEAT STORAGE AND RELEASE UNIT

(71) Applicants: Yasutomo Aman, Kanagawa (JP); Yohei Shiren, Tokyo (JP); Masahiro Masuzawa, Kanagawa (JP); Hiroko Ohkura, Kanagawa (JP); Yoshifumi Ohba, Kanagawa (JP)

(72) Inventors: Yasutomo Aman, Kanagawa (JP); Yohei Shiren, Tokyo (JP); Masahiro Masuzawa, Kanagawa (JP); Hiroko Ohkura, Kanagawa (JP); Yoshifumi Ohba, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 310 days.

(21) Appl. No.: 14/242,954

(22) Filed: Apr. 2, 2014

(65) Prior Publication Data
US 2014/0305142 A1    Oct. 16, 2014

(30) Foreign Application Priority Data

Apr. 15, 2013 (JP) .................................. 2013-085134
Jan. 8, 2014 (JP) .................................. 2014-001502

(51) Int. Cl.
| F25B 17/08 | (2006.01) |
| F24J 1/00 | (2006.01) |
| F25D 5/00 | (2006.01) |
| F28D 20/00 | (2006.01) |

(52) U.S. Cl.
CPC .. *F24J 1/00* (2013.01); *F25D 5/00* (2013.01); *F28D 20/003* (2013.01); *F28D 2020/0013* (2013.01); *Y02E 60/142* (2013.01)

(58) Field of Classification Search
CPC ........ F25B 17/08; F25B 15/06; Y02B 30/64; F25D 5/02
USPC ............. 62/4, 476, 480; 252/71; 126/263.01
See application file for complete search history.

(56) References Cited

U.S. PATENT DOCUMENTS

| 5,049,404 A * | 9/1991 | Kisler ...................... B05B 5/08 |
| | | 118/626 |
| 5,523,061 A * | 6/1996 | Hao ........................ B01D 3/009 |
| | | 203/DIG. 6 |
| 5,536,488 A * | 7/1996 | Mansour .................. B01B 1/005 |
| | | 423/652 |
| 2010/0065244 A1 | 3/2010 | Yokoyama et al. |

FOREIGN PATENT DOCUMENTS

| JP | H10-286460 | 10/1998 |
| JP | 2014-052146 | 3/2014 |
| WO | 2009/002893 | 12/2008 |
| WO | 2012/108288 | 8/2012 |

OTHER PUBLICATIONS

Extended European Search Report dated Sep. 1, 2014.

* cited by examiner

*Primary Examiner* — Melvin Jones
(74) *Attorney, Agent, or Firm* — IPUSA, PLLC

(57) ABSTRACT

A reaction material formed body into which a reaction material reacting with a reaction medium to store or release heat is formed includes first and second opposite surfaces and multiple heat transfer enhancing members extending at least from the first surface to the second surface. At least two or more of the heat transfer enhancing members are oriented in a predetermined single direction.

12 Claims, 15 Drawing Sheets

REACTION MATERIAL FORMED BODY AND HEAT STORAGE AND RELEASE UNIT

CROSS-REFERENCE TO RELATED APPLICATION

The present application is based upon and claims the benefit of priority of Japanese Patent Applications No. 2013-085134, filed on Apr. 15, 2013, and No. 2014-001502, filed on Jan. 8, 2014, the entire contents of which are incorporated herein by reference.

BACKGROUND OF THE INVENTION

1. Field of the Invention

The present invention generally relates to reaction material formed bodies and heat storage and release units.

2. Description of the Related Art

In recent years, heat recovery systems for recovering and using heat sources such as waste heat, such as chemical heat pumps and adsorption refrigerators, have drawn attention in terms of saving energy.

According to common heat recovery systems, a reaction medium, a heat storage and release unit that exchanges heat with a heat storage material (hereinafter referred to as "reaction material") that reversibly reacts with the reaction medium, an evaporator that evaporates the reaction medium, and a condenser that condenses the reaction medium are connected via an opening and closing mechanism. Furthermore, the heat storage and release unit commonly includes a heating medium channel in which a heating medium moves and a reaction material accommodating part that is thermally coupled to the heating medium channel and accommodates the reaction material.

In order to efficiently recover heat using a heat recovery system, it is preferable that the reaction material and a heat transfer surface thermally coupled to the heating medium channel be constantly in close contact. Therefore, Japanese Laid-Open Patent Application No. 10-286460 discloses the technique of causing an adsorption material (corresponding to a reaction material according to embodiments of the present invention) to adhere fast to the heat transfer surface using a binder in order to improve the heat transfer characteristic between the reaction material and the heat transfer surface.

SUMMARY OF THE INVENTION

According to an aspect of the present invention, a reaction material formed body into which a reaction material reacting with a reaction medium to store or release heat is formed includes first and second opposite surfaces and multiple heat transfer enhancing members extending at least from the first surface to the second surface. At least two or more of the heat transfer enhancing members are oriented in a predetermined single direction.

According to an aspect of the present invention, a heat storage and release unit includes the reaction material formed body as set forth above, a reaction material accommodating part accommodating the reaction material formed body and including a heat transfer surface that exchanges heat with the reaction material formed body, and a reaction material pressing member configured to press the reaction material formed body against the heat transfer surface.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

As described above, Japanese Laid-Open Patent Application No. 10-286460 discloses the technique of causing the adsorption material to adhere fast to the heat transfer surface using a binder.

According to the method disclosed in Japanese Laid-Open Patent Application No. 10-286460, however, it is necessary to replace the whole heat storage and release unit when the adsorption material is replaced because of degradation over time, thus resulting in high running cost.

Furthermore, according to the method of Japanese Laid-Open Patent Application No. 10-286460, graphite is mixed in the adsorption material as a heat transfer enhancing material in order to improve the heat transfer characteristic inside the adsorption material layer. According to the mixing method described in Japanese Laid-Open Patent Application No. 10-286460, however, it is necessary to mix a large amount of the heat transfer enhancing material in order to obtain a high heat transfer characteristic. An increase in the mixture ratio of the heat transfer enhancing material decreases the filling ratio of the adsorption material and increases heat loss for the sensible heat of the heat transfer enhancing material. As a result, the coefficient of performance (COP), which is one of the performance indices of the output of the heat storage and release unit relative to a thermal input to the heat storage and release unit, decreases. Therefore, there is a demand for the development of a reaction material (unit) that has a high thermal conductivity in a predetermined heat transfer direction even with a limited amount of the heat transfer enhancing material and enjoys high heat exchange performance between the heat storage and release unit and the heat transfer surface.

According to an aspect of the present invention, a reaction material formed body is provided that enjoys high heat exchange performance between a heat storage and release unit and a heat transfer surface and is easily replaceable in the case of degradation.

A description is given below of embodiments of the present invention.

A description is given of configurations of heat storage and release units in which a reaction material formed body according to an embodiment of the present invention may be used. According to embodiments of the present invention, the reaction material formed body is not limited, and may be applied to, for example, a plate heat storage and release unit and a fin tube heat storage and release unit. First, a description is given, with reference to FIG. 1 and FIG. 2, of configurations of plate heat storage and release units. Then, a description is given, with reference to FIG. 3, of a configuration of a fin tube heat storage and release unit.

Figure 1:
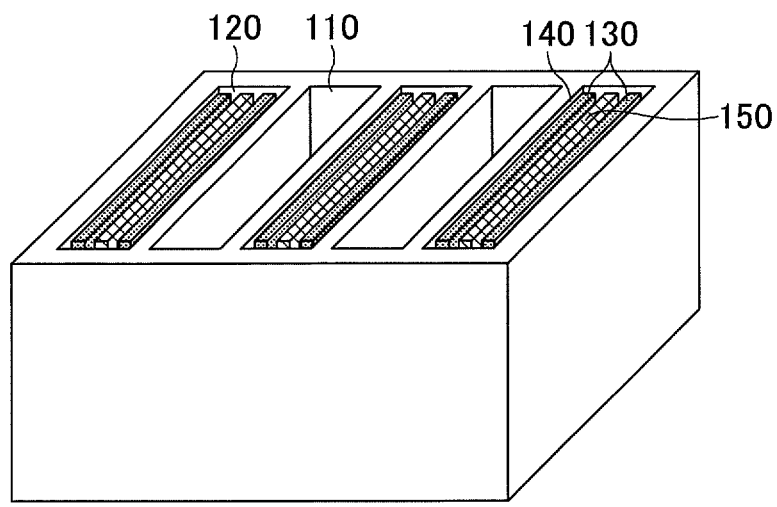
FIG. 1 is a schematic diagram illustrating a configuration of a heat storage and release unit according to an embodiment of the present invention.

FIG. 1 is a schematic diagram illustrating a configuration of a heat storage and release unit according to an embodiment of the present invention.

Referring to FIG. 1, a heat storage and release unit 100a includes heating medium channels 110 in which a heating medium moves and reaction material accommodating parts 120 thermally coupled to the heating medium channels 110. In general, multiple heating medium channels and multiple reaction material accommodating parts are provided in a single heat storage and release unit.

Below-described reaction material formed bodies 130, which may simply be referred to as "reaction materials," and a reaction material pressing member 150 are provided in each reaction material accommodating part 120. The reaction material pressing member 150 presses each reaction material formed body 130 against a corresponding heat transfer surface 140, which is a wall part of the reaction material accommodating part 120. In the case of FIG. 1, a pair of (two) reaction material formed bodies 130 are accommodated in each reaction material accommodating part 120, and the reaction material pressing member 150 is placed between the two reaction material formed bodies 130 to press the reaction material formed body 130 on each side against the corresponding heat transfer surface 140.

Figure 2:
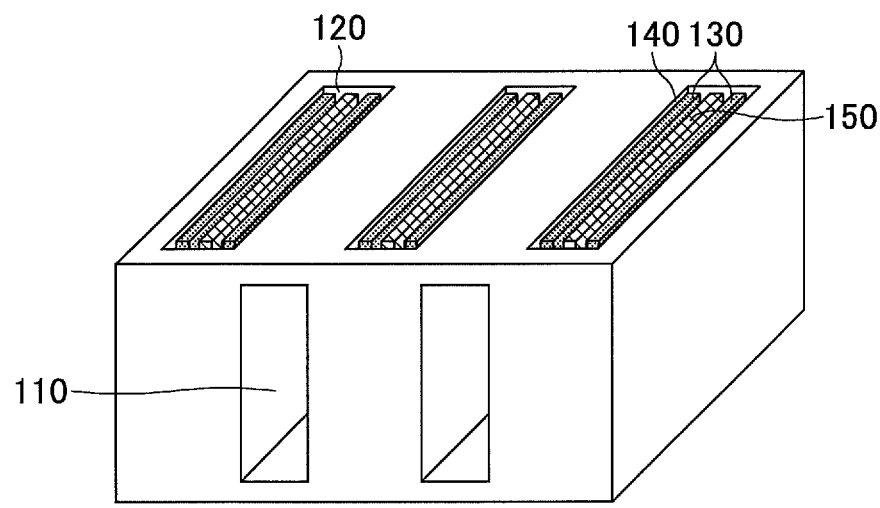
FIG. 2 is schematic diagram illustrating another configuration of a heat storage and release unit according to the embodiment.

Furthermore, FIG. 2 is schematic diagram illustrating another configuration of a heat storage and release unit according to the embodiment. Like the heat storage and release unit 100a of FIG. 1, a heat storage and release unit 100b of FIG. 2 is a plate heat storage and release unit. The heat storage and release unit 100b has the same configuration as the heat storage and release unit 100a of FIG. 1 except that the heating medium channels 110 are rotated 90 degrees relative to the heat storage and release unit 100a of FIG. 1. The reaction material formed bodies 130 of this embodiment may be suitably used for the heat storage and release unit 100b as well.

Figure 3:
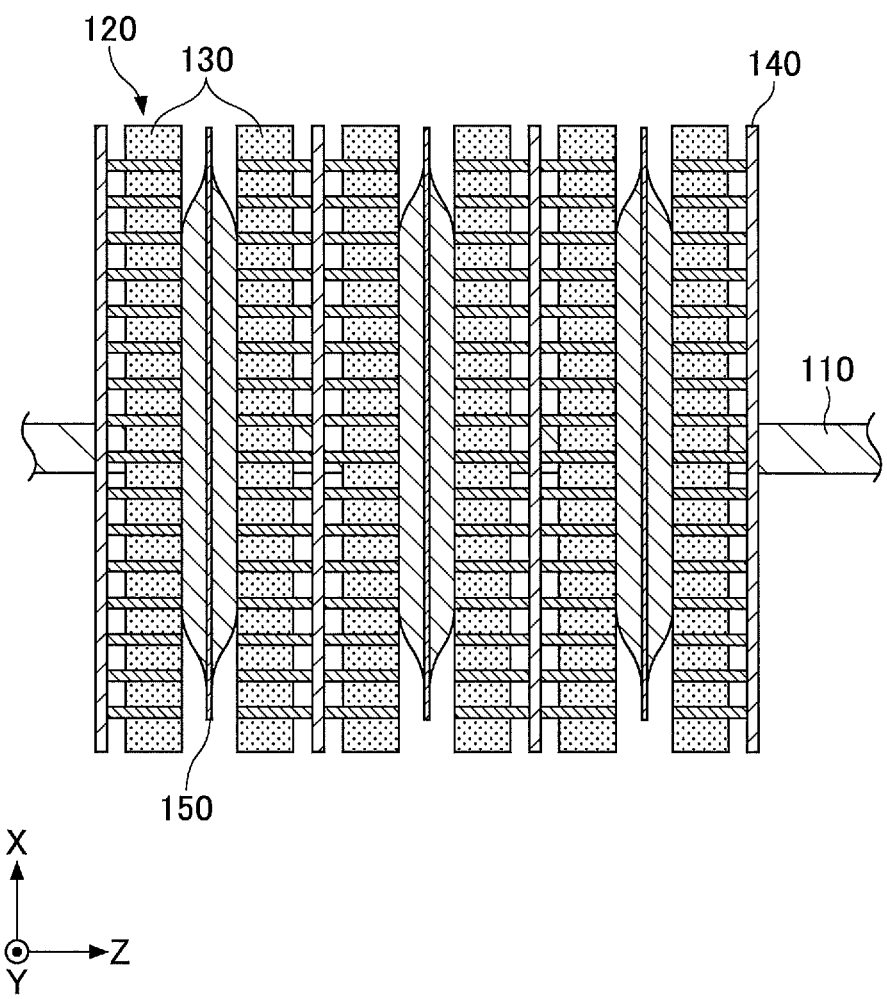
FIG. 3 is a schematic diagram illustrating another configuration of a heat storage and release unit according to the embodiment.

Furthermore, FIG. 3 is a schematic diagram illustrating another configuration of a heat storage and release unit according to the embodiment. A heat storage and release unit 100c of FIG. 3 is a fin tube heat storage and release unit. Like the heat storage and release units 100a and 100b, the heat storage and release unit 100c includes the heating medium channel 110 in which a heating medium moves and the reaction material accommodating part 120 thermally coupled to the heating medium channel 110. In the following description, the heat storage and release units 100a, 100b and 100c may collectively be referred to as "heat storage and release unit 100" when no distinction is made among the heat storage and release units 100a, 100b and 100c.

The reaction material formed bodies 130 and the reaction material pressing members 150 that press the reaction material formed bodies 130 against the corresponding heat transfer surface 140, which are heat transfer fins, are placed in the reaction material accommodating part 120.

That is, the reaction material formed bodies 130 of this embodiment may be applied to any form of a heat storage and release unit as long as the heat storage and release unit is formed so as to have a reaction material formed body pressed against and fixed to a heat transfer surface by a reaction material pressing member.

In FIG. 1 through FIG. 3, the heat storage and release units 100a through 100c are partially illustrated in a simplified manner, and the heat storage and release units 100a through 100c may include other configurations. Examples of other configurations include pipes into which the heat medium channels 110 are gathered to have a heating medium move in and out through the pipes, and a channel that guides a reaction medium that reacts with the reaction material formed bodies 130.

Next, a description is given of a configuration of the reaction material formed bodies 130 according to an embodiment of the present invention. In the following description, the reaction material formed bodies 130 may collectively be referred to as "reaction material formed body 130" for convenience of description.

In this embodiment, the reaction material formed body 130 preformed into, for example, a block shape or a flat plate shape is used as a reaction material. The method of forming the reaction material formed body 130 is not limited in particular, and the reaction material formed body 130 may be formed into a desired shape using a known binder, for example.

The material of the reaction material is not limited in particular. Any material may be used as long as the material is capable of being reversibly adsorbed to and desorbed from a reaction medium and is in the form of a solid or gel in the process of adsorption and desorption.

Examples of reaction media include water, ammonia and methanol. In the case of using water as a reaction medium, a usable reaction material may be, but is not limited to, for example, calcium sulfate, sodium sulfate, calcium chloride, magnesium chloride, manganese chloride, calcium oxide, magnesium oxide, sodium acetate, or sodium carbonate. In the case of using ammonia as a reaction medium, a usable reaction material may be, but is not limited to, for example, manganese chloride, magnesium chloride, nickel chloride, barium chloride, or calcium chloride. In the case of using methanol as a reaction medium, a usable reaction material may be, but is not limited to, for example, manganese chloride. Each of these reaction materials may be used alone or two or more of these reaction materials may be used in mixture.

The reaction material may be used in mixture with a highly thermally conductive material in order to increase thermal conductivity. Examples of highly thermally conductive materials include granulated expanded graphite and metal powder.

Furthermore, while the above-described reaction materials include deliquescent materials, even such deliquescent materials may also be used as reaction materials if the deliquescent materials are solidified in the process of heat storage and heat release as a result of being mixed with expanded graphite or the like by impregnation.

Furthermore, the reaction material formed body 130 according to this embodiment includes below-described multiple heat transfer enhancing members 135 at least inside the reaction material formed body 130. A description is given, with reference to drawings, of forms of arrangement of the heat transfer enhancing members 135.

Figure 4:
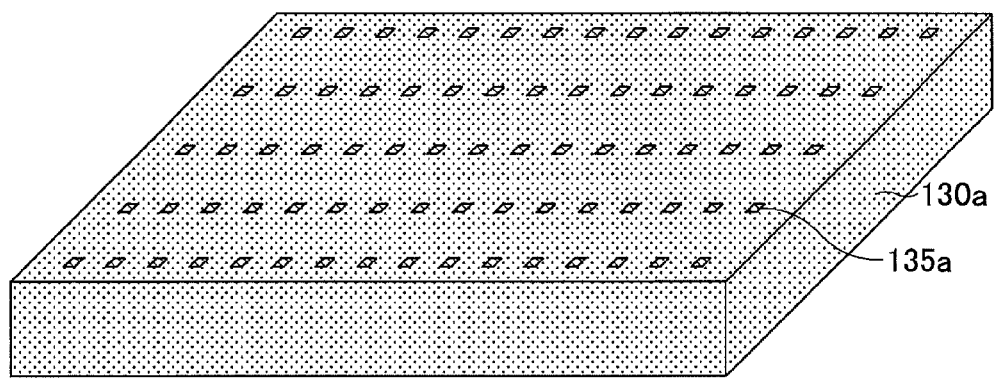
FIG. 4 is a schematic perspective view of a reaction material formed body according to an embodiment of the present invention.
Figure 5:
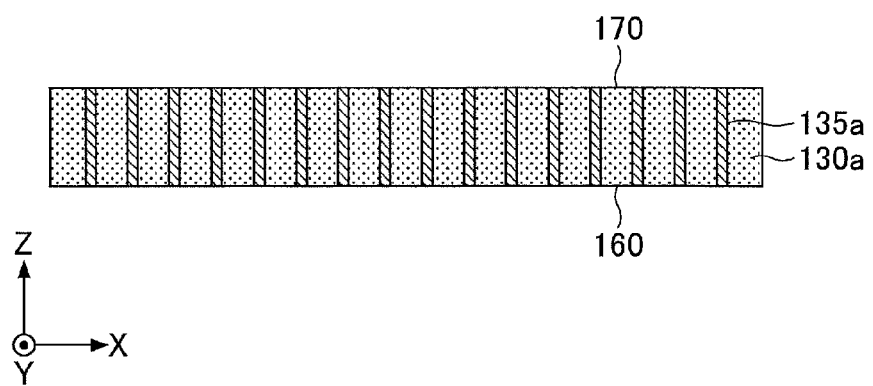
FIG. 5 is a schematic diagram for illustrating a form of arrangement of heat transfer enhancing members according to the embodiment.

FIG. 4 is a schematic perspective view of a reaction material formed body according to an embodiment of the present invention. FIG. 5 is a schematic diagram for illustrating a form of arrangement of heat transfer enhancing members according to this embodiment. To be more specific, FIG. 5 illustrates an X-Z cross section of the reaction material formed body of FIG. 4 passing through the heat transfer enhancing members.

Referring to FIG. 5, a reaction material formed body 130a of this embodiment includes multiple heat transfer enhancing members 135a. The reaction material formed body 130a includes first and second opposite surfaces 160 and 170, and the heat transfer enhancing members 135a are formed through the reaction material formed body 130a to extend from the first surface 160 to the second surface 170.

Furthermore, the heat transfer enhancing members 135a are arranged so that at least some of the heat transfer enhancing members 135a (all of the heat transfer enhancing members 135a in the case of FIG. 5) are oriented in a predetermined (single) direction (that is, the same direction). In the case of using the reaction material formed body 130a of this embodiment, the reaction material formed body 130a is placed so that the first surface 160 or the second surface 170, corresponding to one end of the heat transfer enhancing members 135a, exchanges heat with the corresponding heat transfer surface 140 of the heat storage and release unit 100.

By placing the heat transfer enhancing members 135a so that at least some of the heat transfer enhancing members 135a are oriented in a predetermined single direction, it is possible to form a heat transfer path in the direction of orientation in the reaction material formed body 130a. Therefore, it is possible to improve the thermal conductivity of the reaction material formed body 130a (including the heat transfer enhancing members 135a) in a predetermined heat transfer direction. Here, the term "predetermined heat transfer direction" means a direction substantially perpendicular to a heat transfer surface of a heat storage and release unit, that is, a direction in which the heat released from the reaction material formed body 130a is transmitted or a direction in which heat to be stored in the reaction material formed body 130a is transmitted, when the reaction material formed body 130a is accommodated in the heat storage and release unit.

The material of the heat transfer enhancing members 135a is not limited in particular as long as the material may be processed to be long enough to form a heat transfer path relative to the size of the reaction material formed body 130a in the heat transfer direction and has good thermal conductivity. Specific examples of the material of the heat transfer enhancing members 135a include carbon and metal materials such as copper and aluminum.

As an example arrangement of the heat transfer enhancing members 135a, a description is given of the case of forming the heat transfer enhancing members 135a in the calcium sulfate reaction material formed body 130 of 200 mm in width, 100 mm in length and 5 mm in thickness, for example. In this case, as the heat transfer enhancing members 135a, carbon fibers of 2 mass % by weight-based mixture ratio are dispersed in the thickness direction (the Z direction in FIG. 4 and FIG. 5) of the reaction material formed body 130a. Then, a surface of the reaction material formed body 130a defined by the width direction and the length direction (the X direction and the Y direction in FIG. 4 and FIG. 5) may be used as a heat transfer surface to exchange heat with the heat storage and release unit 100. The form of formation of the heat transfer enhancing members 135a may be suitably changed by a person having ordinary skill in the art in accordance with the material, size, etc., of the reaction material formed body 130a.

Figure 6:
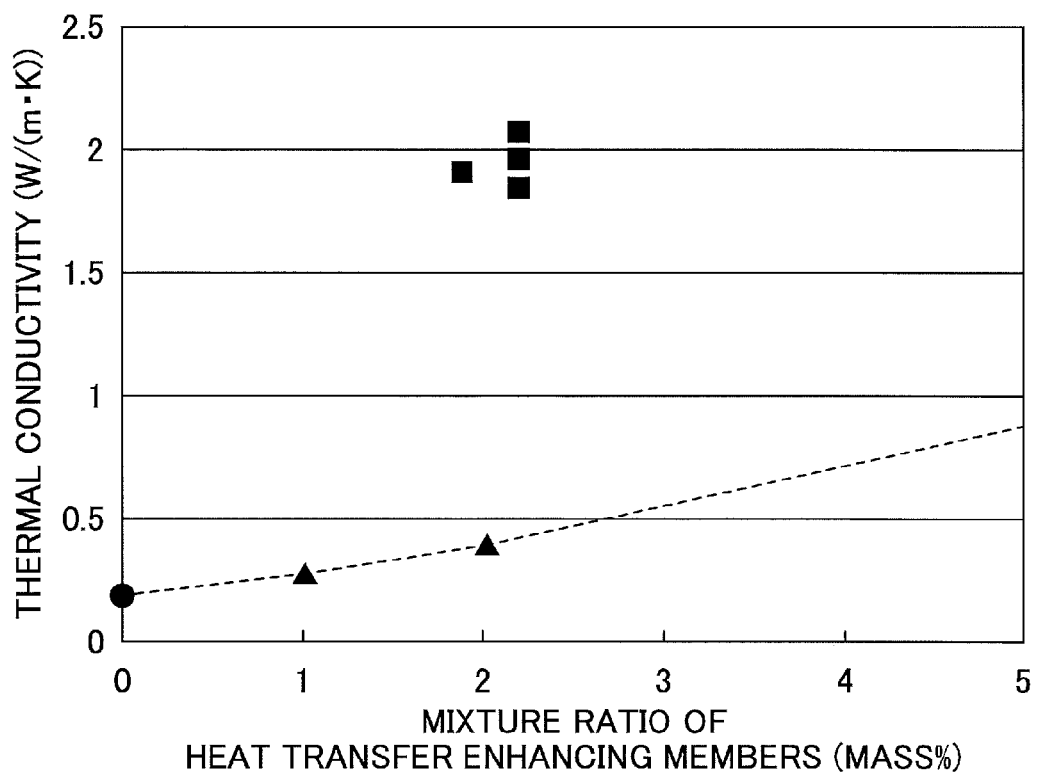
FIG. 6 is a schematic diagram for illustrating an effect of heat transfer enhancing members according to the embodiment.

FIG. 6 is a schematic diagram for illustrating an effect of heat transfer enhancing members according to this embodiment. In FIG. 6, the horizontal axis represents the mixture ratio (mass %) of heat transfer enhancing members to a reaction material formed body, and the vertical axis represents the thermal conductivity (W/(m·k)) of the reaction material formed body in a predetermined heat transfer direction. Furthermore, in FIG. 6, a circle indicates a reaction material formed body including no heat transfer enhancing members (where the mixture ratio of heat transfer enhancing members is 0 mass %), a triangle indicates a reaction material formed body including heat transfer enhancing members, which are not oriented in a predetermined single direction, and a square indicates a reaction material formed body including heat transfer enhancing members, at least some of which are oriented in a predetermined single direction. Calcium sulfate was used as reaction material formed bodies and carbon fibers were used as heat transfer enhancing members.

As indicated imaginarily by a dotted line in FIG. 6, the thermal conductivity of a reaction material formed body in a predetermined heat transfer direction is improved by increasing the mixture ratio of heat transfer enhancing members even when the heat transfer enhancing members are not oriented in a predetermined single direction. It is found, however, that the thermal conductivity of the reaction material formed body in a predetermined heat transfer direction is significantly improved by causing at least some of the heat transfer enhancing members included in the reaction material formed body to be oriented in a predetermined single direction. According to this embodiment, by causing at least some of heat transfer enhancing members to be oriented in a predetermined single direction, approximately five times as high thermal conductivity as that of a reaction material formed body in which no heat transfer enhancing members are oriented in a predetermined single direction is obtained. To be more specific, even in the case of mixing as limited heat transfer enhancing members as approximately 2 mass % in mixture ratio, the thermal conductivity of a reaction material formed body according to this embodiment in a predetermined heat transfer direction is an extremely high value of approximately 2 W/(m·k). That is, a reaction material formed body according to this embodiment has a high heat transfer characteristic while being low in the mixture ratio of heat transfer enhancing members (that is, high in the filling ratio of a reaction material). Therefore, it is possible to reduce heat loss for the sensible heat of heat transfer enhancing members due to reduction in the filling ratio of a reaction material, and to prevent COP reduction.

The shape of the heat transfer enhancing members 135a is not limited in particular as long as the heat transfer enhancing members 135a are long enough to extend from the first surface 160 to the second surface 170 of the reaction material formed body 130a, and may be, for example, a needle shape, a string shape or a thin strip shape.

Figure 7:
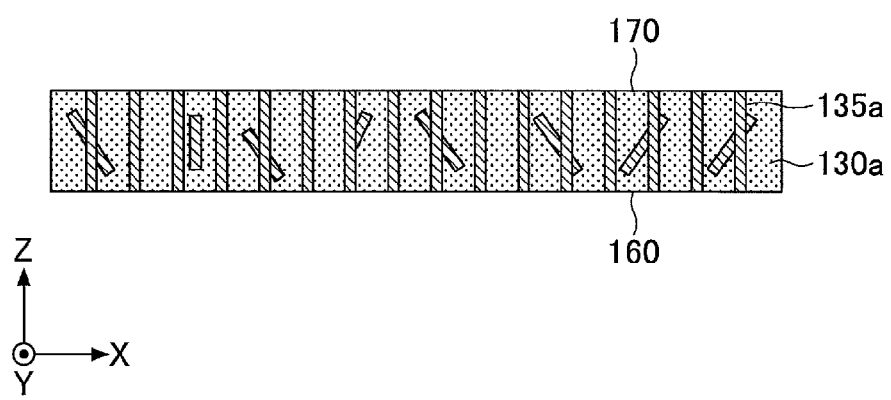
FIG. 7 is a schematic diagram for illustrating another form of arrangement of heat transfer enhancing members according to the embodiment.

It is desirable that all of the heat transfer enhancing members 135a be oriented in a predetermined single direction, while at least part (some) of the heat transfer enhancing members 135a alone may be oriented in a predetermined single direction. FIG. 7 is a schematic diagram for illustrating another form of arrangement of heat transfer enhancing members according to this embodiment. As illustrated in FIG. 7, at least some of the heat transfer enhancing members 135a alone may be oriented in a predetermined single direction.

Furthermore, as illustrated in FIG. 7, some of the heat transfer enhancing members 135a may be enclosed inside the reaction material formed body 130a.

A higher area occupancy of the heat transfer enhancing members 135a at the first surface 160 and the second surface 170 of the reaction material formed body 130a is more preferable in terms of heat exchange performance. The area occupancy of the heat transfer enhancing members 135a may be increased by, for example, increasing the number of the heat transfer enhancing members 135a or increasing the cross-sectional area of the heat transfer enhancing members 135a.

Figure 8:
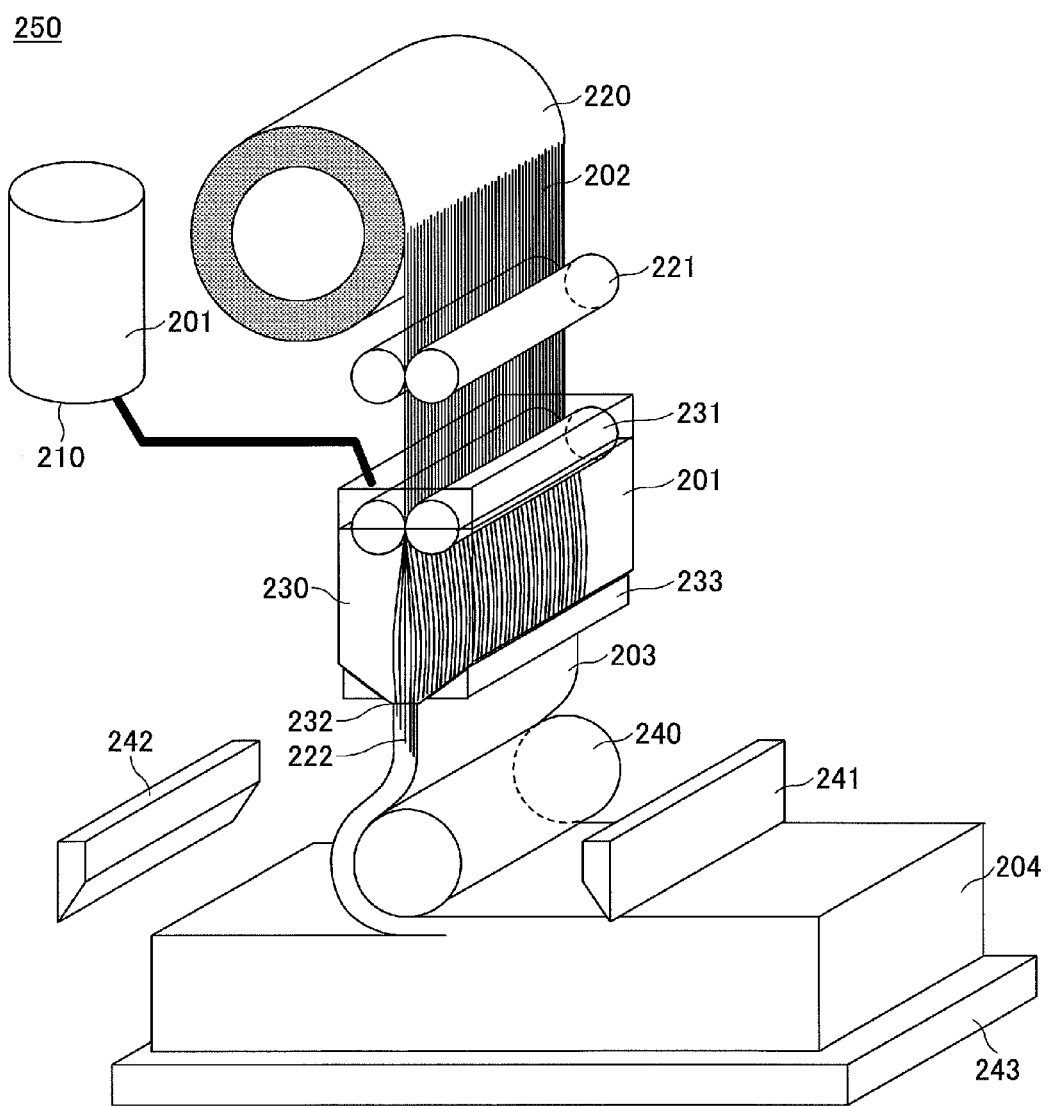
FIG. 8 is a schematic diagram for illustrating a manufacturing apparatus that manufactures a reaction material formed body according to the embodiment.

Next, a description is given, with reference to drawings, of a manufacturing apparatus capable of manufacturing a reaction material formed body according to this embodiment. FIG. 8 is a schematic diagram for illustrating a manufacturing apparatus that manufactures a reaction material formed body according to this embodiment.

The arrangement structure of the heat transfer enhancing members 135a of the reaction material formed body 130 according to this embodiment may be manufactured using a reaction material impregnated heat transfer enhancing member bundle layered unit 250 (hereinafter simply referred to as "manufacturing apparatus 250") as illustrated in FIG. 8. By way of example, a description is given of a configuration of the manufacturing apparatus 250 that manufactures the reaction material formed body 130a of this embodiment that has the heat transfer characteristic indicated by squares in FIG. 6.

The manufacturing apparatus 250 of this embodiment includes a reaction material supply part 210, a belt-shaped heat transfer enhancing member bundle supply source 220, and a reaction material impregnation bath 230. The reaction material supply part 210 supplies a fluid reaction material 201 to the reaction material impregnation bath 230. Multiple heat transfer enhancing members are arranged and formed into a belt shape to become a belt-shaped heat transfer enhancing member bundle 202, which is rolled up into the belt-shaped heat transfer enhancing member bundle supply source 220. The reaction material impregnation bath 230 is filled with the fluid reaction material 201 supplied from the reaction material supply part 210.

The manufacturing apparatus 250 according to this embodiment further includes belt-shaped heat transfer enhancing member feeding rollers 221 and belt-shaped heat transfer enhancing member introducing rollers 231. The belt-shaped heat transfer enhancing member feeding rollers 221 feed the belt-shaped heat transfer enhancing member bundle 202 from the belt-shaped heat transfer enhancing member bundle supply source 220. The belt-shaped heat transfer enhancing member introducing rollers 231 introduce the belt-shaped heat transfer enhancing member bundle 202 fed from the belt-shaped heat transfer enhancing member feeding rollers 221 into the reaction material impregnation bath 230.

Furthermore, the reaction material impregnation bath 230 of the manufacturing apparatus 250 of this embodiment includes, at its bottom, a reaction material impregnated heat transfer enhancing member bundle outlet 232 through which a reaction material impregnated heat transfer enhancing member bundle 203 is discharged. A reaction material impregnated heat transfer enhancing member bundle cutting mechanism 233 that cuts the reaction material impregnated heat transfer enhancing member bundle 203 is provided below the reaction material impregnated heat transfer enhancing member bundle outlet 232.

A pressing roller 240, a forward movement stage 241, a backward movement stage 242, and a layering stage 243 are provided below the reaction material impregnated heat transfer enhancing member bundle cutting mechanism 233. The forward movement stage 241 and the backward movement stage 242 are provided across the pressing roller 240 from each other. The layering stage 243 moves forward and backward so that a heat transfer enhancing member arranged layered reaction material 204 (hereinafter, "layered reaction material 204") is formed on the layering stage 243.

Next, a description is given, with reference to FIGS. 9A, 9B, 9C and 9D, of an operation of the above-described manufacturing apparatus 250 according to this embodiment. FIGS. 9A through 9D are schematic diagrams for illustrating an operation of a manufacturing apparatus that manufactures a reaction material formed body according to this embodiment.

Figure 9A:
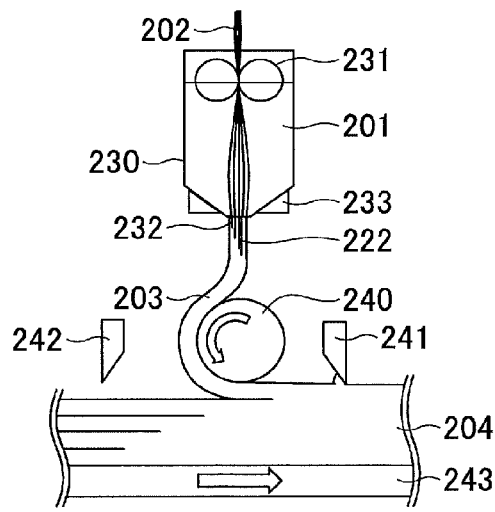
FIGS. 9A, 9B, 9C and 9D are schematic diagrams for illustrating an operation of the manufacturing apparatus according to the embodiment.

Referring to FIG. 9A, the belt-shaped heat transfer enhancing member bundle 202 fed from the belt-shaped heat transfer enhancing member feeding rollers 221 is introduced into the reaction material impregnation bath 230 through the belt-shaped heat transfer enhancing member introducing rollers 231. As a result, the belt-shaped heat transfer enhancing member bundle 202 is impregnated with the fluid reaction material 201. The reaction material impregnated heat transfer enhancing member bundle 203, impregnated with the fluid reaction material 201, passes through the reaction material impregnated heat transfer enhancing member bundle outlet 232 to be stacked on the layered reaction material 204 on the layering stage 243 moving rightward, for example, while being pressed by the pressing roller 240 rotating counterclockwise, for example, and the forward movement stage 241.

Figure 9B:
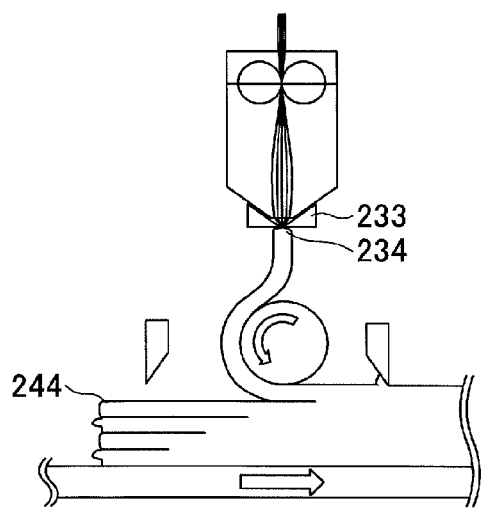

Next, when layering progresses to reach an end of the layering stage 243, the reaction material impregnated heat transfer enhancing member bundle 203 is cut by the reaction material impregnated heat transfer enhancing member bundle cutting mechanism 233 to such a length that an end of the cut reaction material impregnated heat transfer enhancing member bundle 203 (hereinafter referred to "cut end 234") is to be located at substantially the same position as an end 244 of the layered reaction material 204 as illustrated in FIG. 9B, and layering continues.

Figure 9C:
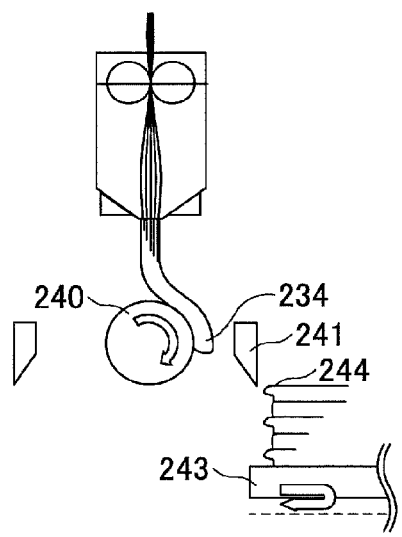

Next, as illustrated in FIG. 9C, the rotation of the pressing roller 240 is reversed (to a clockwise direction in FIGS. 9A through 9D) after the position of the pressing roller 240 goes beyond the end 244 because of the forward movement of the layering stage 243. Furthermore, after the position of the forward movement stage 241 goes beyond the end 244 because of the forward movement of the layering stage 243, the layering stage 243 is lowered (moved downward) by a layer of the layered reaction material 204, and the layering stage 243 is caused to move in the reverse direction (leftward in FIGS. 9A through 9D).

Figure 9D:
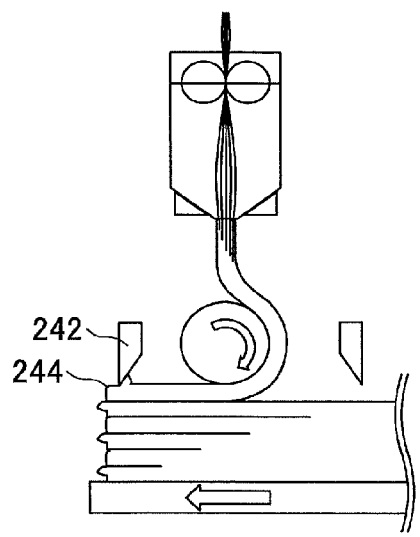

Then, the rotation speed of the pressing roller 240 and/or the introduction speed of the reaction material impregnated heat transfer enhancing member bundle 203 are adjusted so that the end 244 and the cut end 244 are at substantially the same position in a horizontal direction, and layering in the backward direction is started as illustrated in FIG. 9D.

By repeating the above-described process, the layered reaction material 204 is completed. The obtained layered reaction material 204 is subjected to a hardening process such as drying and firing and is shaped in accordance with the shape and size of the reaction material accommodating parts 120 (FIG. 1 through FIG. 3) of the heat storage and release unit 100 to be used, so that a reaction material formed body according to this embodiment is obtained. To be more specific, the layered reaction material 204 is cut so that the long axis directions of heat transfer enhancing members 222 are perpendicular to the heat transfer surfaces 140 of the heat storage and release unit 100. In the case of exposing the heat transfer enhancing members 222 on a surface of the reaction material formed body 130a, a reaction material on the surface is removed by using a solvent that dissolves a hardened reaction material or brushing. As a result, it is possible to ensure the contact of the heat transfer enhancing members 222 with the heat transfer surfaces 140 of the heat storage and release unit 100 and also to ensure ventilation passages for a reaction medium.

Next, a description is given of an example arrangement in the case of applying the reaction material formed body 130a of this embodiment to the heat storage and release unit 100a (FIG. 1).

Figure 10:
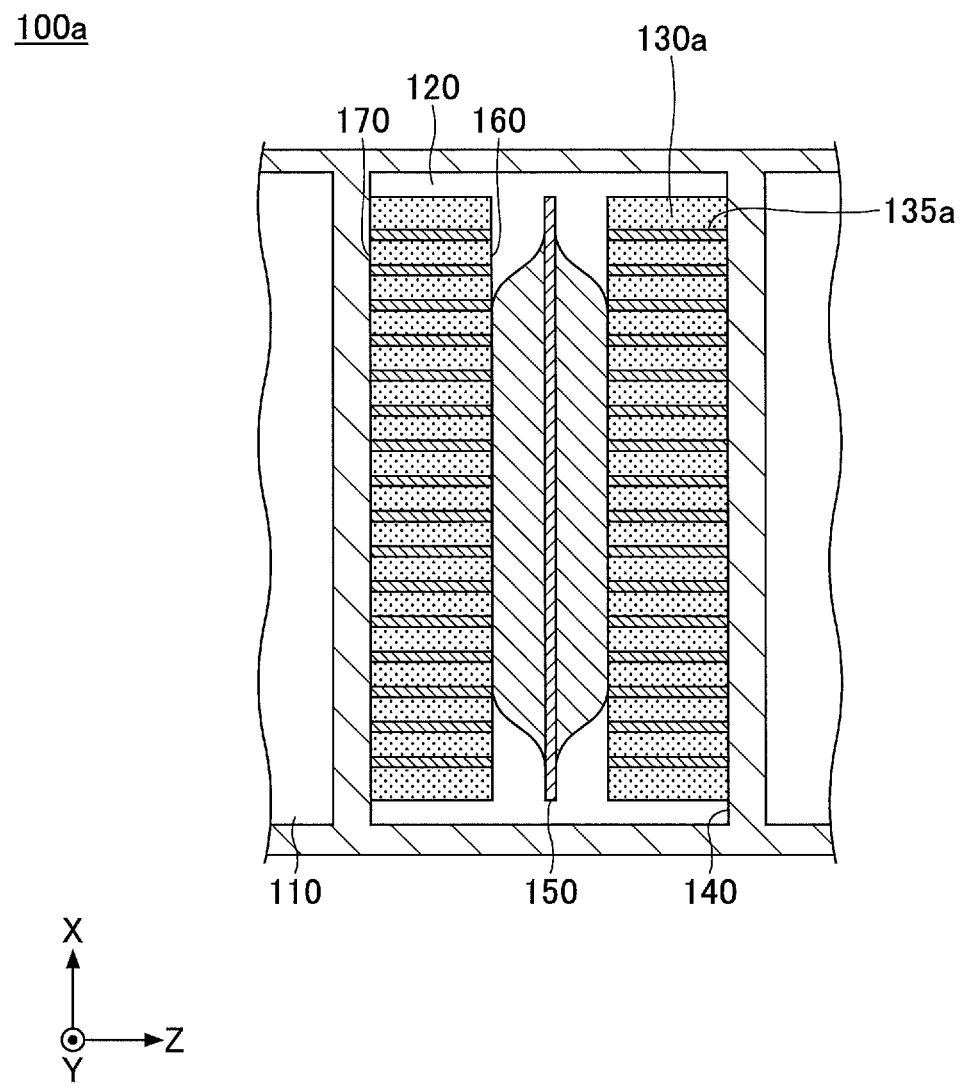
FIG. 10 is a schematic enlarged view of part of a heat storage and release unit around one of reaction material accommodating parts according to the embodiment.

FIG. 10 is a schematic enlarged view of part of the heat storage and release unit 100a around one of the reaction material accommodating parts 120 according to this embodiment. According to this embodiment, a pair of (two) reaction material formed bodies 130a are accommodated in each reaction material accommodating part 120, and the reaction material formed bodies 130a are pressed against the corresponding heat transfer surfaces 140 by the corresponding reaction material pressing member 150.

The reaction material pressing member 150 is not limited in particular as long as the reaction material pressing member 150 is capable of pressing the reaction material formed bodies 130a against the heat transfer surfaces 140. For example, a hermetically sealed hollow body capable of expanding and contracting due to a pressure difference between the inside pressure and the outside pressure or a corrugated spring member may be used as the reaction material pressing member 150. In the embodiment illustrated in FIG. 1, a hermetically sealed hollow body (a hollow structure) is used as each reaction material pressing member 150.

According to this embodiment, the "hermetically sealed hollow body" may deform, that is, expand and contract, within a pressure range in which the heat storage and release unit 100a is normally used. The hermetically sealed hollow body is capable of expanding to press the reaction material formed bodies 130a against and fix the reaction material formed bodies 130a to the heat transfer surfaces 140 when placed in a vacuum. Furthermore, when placed in the atmosphere, the hermetically sealed hollow body contracts to lose the pressing force, thus making it possible to replace the reaction material formed bodies 130, for example.

The reaction material pressing member 150 of a hermetically sealed hollow body may be formed using a material such as metal foil, for example. It is preferable to manufacture a hermetically sealed hollow body using metal foil. This is because in this case, the heat capacity of the hermetically sealed hollow body is limited, so that it is possible to efficiently use heat generated by the reaction with a reaction medium.

Thus, according to this embodiment, the reaction material formed body 130a includes the heat transfer enhancing members 135a at least inside the reaction material formed body 130a. The heat transfer enhancing members 135a are enclosed inside the reaction material formed body 130a. The heat transfer enhancing members 135a are formed to extend from the first surface 160 to the second surface 170, opposite to the first surface 160, of the reaction material formed body 130a. Using this reaction material formed body 130a makes it possible to improve the efficiency of heat transfer between the reaction material formed body 130a and the corresponding heat transfer surface of the heat storage and release unit 100. Furthermore, because the reaction material formed body 130a of this embodiment has good thermal conductivity, there is no need to cause the reaction material formed body 130a to fixedly adhere to the heat storage and release unit 100. Therefore, the reaction material formed body 130a is easily replaceable in the case of degradation.

Figure 11:
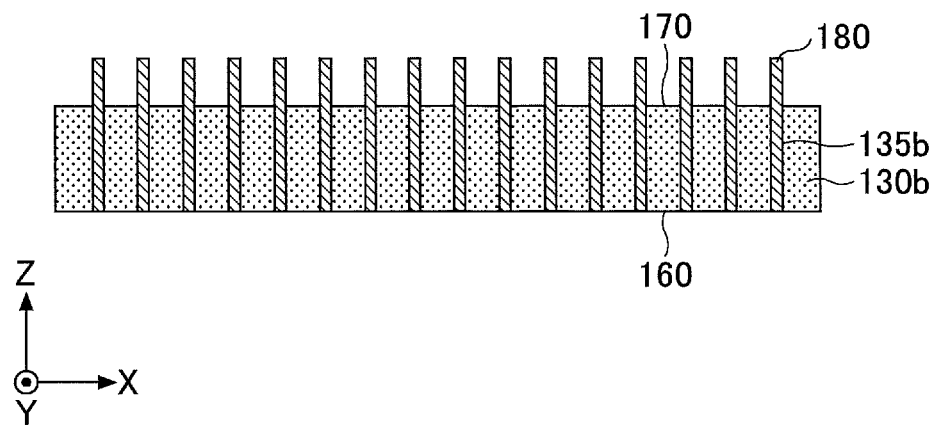
FIG. 11 is a schematic diagram for illustrating a form of arrangement of heat transfer enhancing members according to an embodiment of the present invention.

FIG. 11 is a schematic diagram for illustrating a form of arrangement of heat transfer enhancing members according to another embodiment.

Like the reaction material formed body 130a of the above-described embodiment, a reaction material formed body 130b of this embodiment includes multiple heat transfer enhancing members 135b, and at least part of the heat transfer enhancing members 135b are arranged to be oriented in a predetermined single direction.

Referring to FIG. 11, the heat transfer enhancing members 135b of this embodiment are different from the heat transfer enhancing members 135a of the above-described embodiment in being formed to project from at least one of the first and second surfaces 160 and 170 of the reaction material formed body 130b. That is, the heat transfer enhancing members 135b extend in the thickness direction from the first surface 160 to the second surface 170 so as to have projecting parts 180 exposed from the second surface 170.

A description is given of an example arrangement in the case of applying the reaction material formed body 130b of this embodiment to the heat storage and release unit 100a (FIG. 1).

Figure 12:
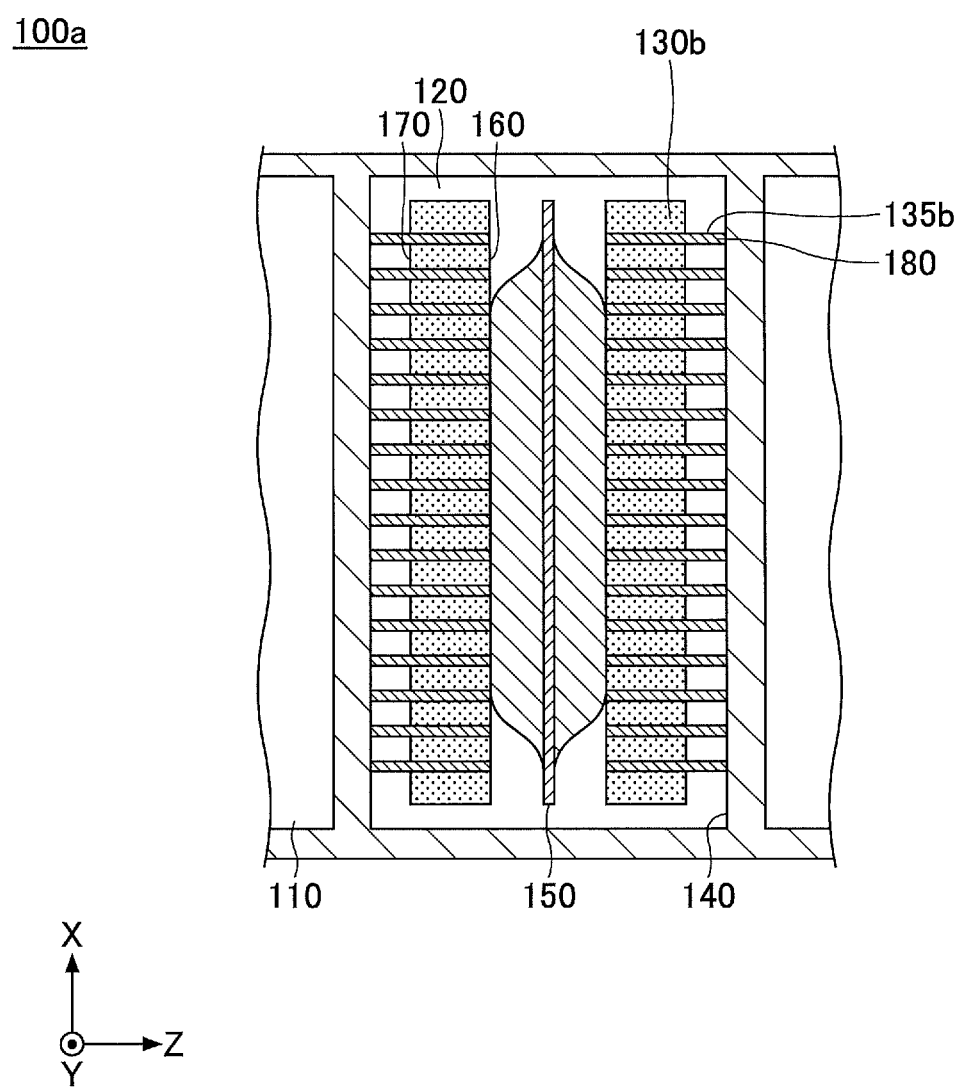
FIG. 12 is a schematic enlarged view of part of a heat storage and release unit around one of reaction material accommodating part according to the embodiment.

FIG. 12 is a schematic enlarged view of part of the heat storage and release unit 100a around one of the reaction material accommodating parts 120 according to this embodiment. As illustrated in FIG. 12, a pair of (two) reaction material formed bodies 130b are accommodated in each reaction material accommodating part 120, and the reaction material formed bodies 130b are pressed against the corresponding heat transfer surfaces 140 by the corresponding reaction material pressing member 150. In this case, heat is exchanged between the reaction material formed bodies 130b and the heat transfer surfaces 140 through the projecting parts 180 of the reaction material formed bodies 130b.

By exchanging heat with the heat transfer surfaces 140 of the heat storage and release unit 100a through portions (that is, the projecting parts 180) of the heat transfer enhancing members 135b, it is possible to reduce thermal resistance at the time of heat transfer. Therefore, it is possible to rapidly exchange heat in heat storage and heat release operations, so that it is possible to increase the output of the heat storage and release unit 100a.

Figure 13:
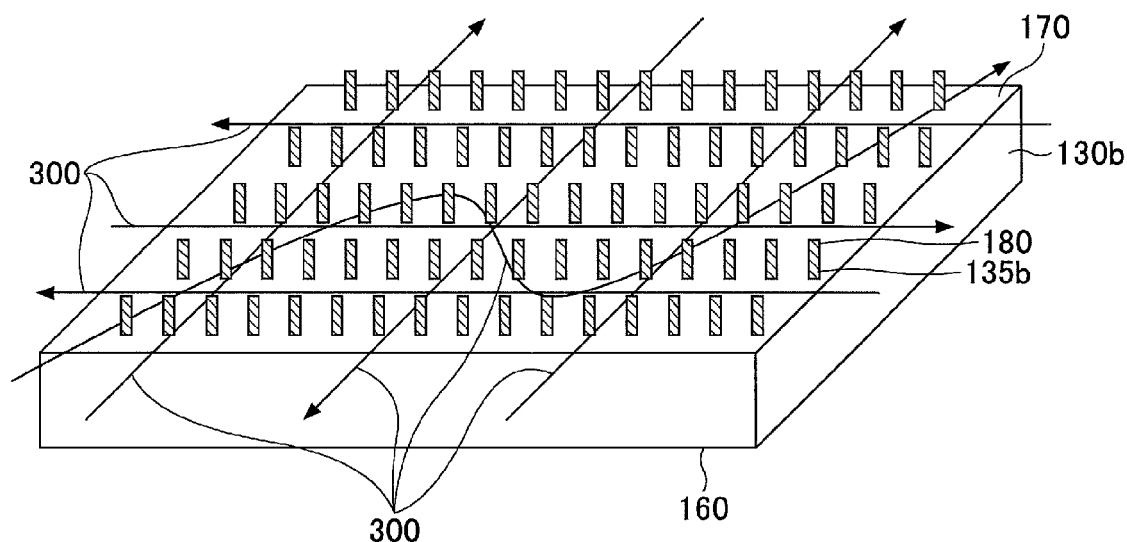
FIG. 13 is a schematic diagram for illustrating another form of arrangement of heat transfer enhancing members according to the embodiment.

Furthermore, according to this embodiment, the heat transfer surfaces 140 may come into contact with the heat transfer enhancing members 135b without directly contacting the reaction material formed bodies 130b. FIG. 13 is a schematic diagram for illustrating another form of arrangement of heat transfer enhancing members according to this embodiment.

In this embodiment, where the heat transfer surfaces 140 come into contact with the heat transfer enhancing members 135b as illustrated in FIG. 12, an air gap is formed between adjacent heat transfer enhancing members 135b. As a result, reaction medium flow passages 300 in which a reaction medium is allowed to (freely) pass, as indicated by arrows by way of example in FIG. 13, are formed. That is, in the heat storage and heat release operations of the heat storage and release unit 100a, it is also possible to use a surface of each reaction material formed body 130b facing toward the corresponding heat transfer surface 140 (that is, the second surface 170 [FIG. 12]) as a reaction surface. Therefore, compared with the case where the heat transfer surfaces 140 come into direct contact with reaction material formed bodies, it is possible to supply a reaction medium sufficiently onto the surface of each reaction material formed body 130b facing toward the corresponding heat transfer surface 140. As a result, the rate of reaction of the reaction material formed bodies 130b increases, so that it is possible to increase the input and output speed of heat.

Figure 14:
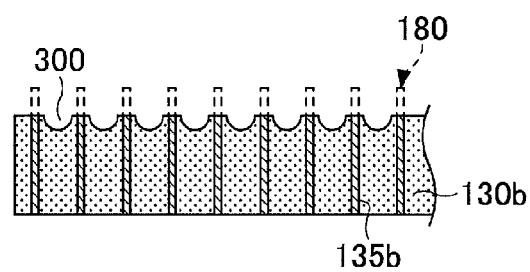
FIG. 14 is a schematic diagram for illustrating a form of arrangement of reaction medium flow passages according to the embodiment.

A description is given, with reference to FIG. 14, of a variation of this embodiment where the reaction medium flow passages 300 are formed. FIG. 14 is a schematic diagram for illustrating a form of arrangement of reaction medium flow passages according to this embodiment.

In the variation illustrated in FIG. 14, the reaction medium flow passages 300 are formed as grooves on the second surface 170 of the reaction material formed body 130b. As described above, forming the reaction medium flow passages 300 in which a reaction medium is allowed to (freely) pass increases the surface area of contact with a reaction medium of the second surface 170 of the reaction material formed body 130b. As a result, like in the embodiment illustrated in FIG. 12, the speed of reaction with a reaction medium of the reaction material formed body 130b increases, so that it is possible to increase the input and output speed of heat. In the cross-sectional view of FIG. 14, the groove parts have a semicircular shape. The shape of the groove parts, however, is not limited to this as long as the groove parts are formed so as to increase the surface area of the second surface 170 of the reaction material formed body 130b.

With respect to the reaction medium flow passages 300, an embodiment in which groove parts are formed and an embodiment in which the projecting parts 180 are provided may be combined as indicated by broken lines in FIG. 14. This combination makes it possible for the reaction material formed body 130b to further increase the surface area of contact with a reaction medium.

Figure 15:
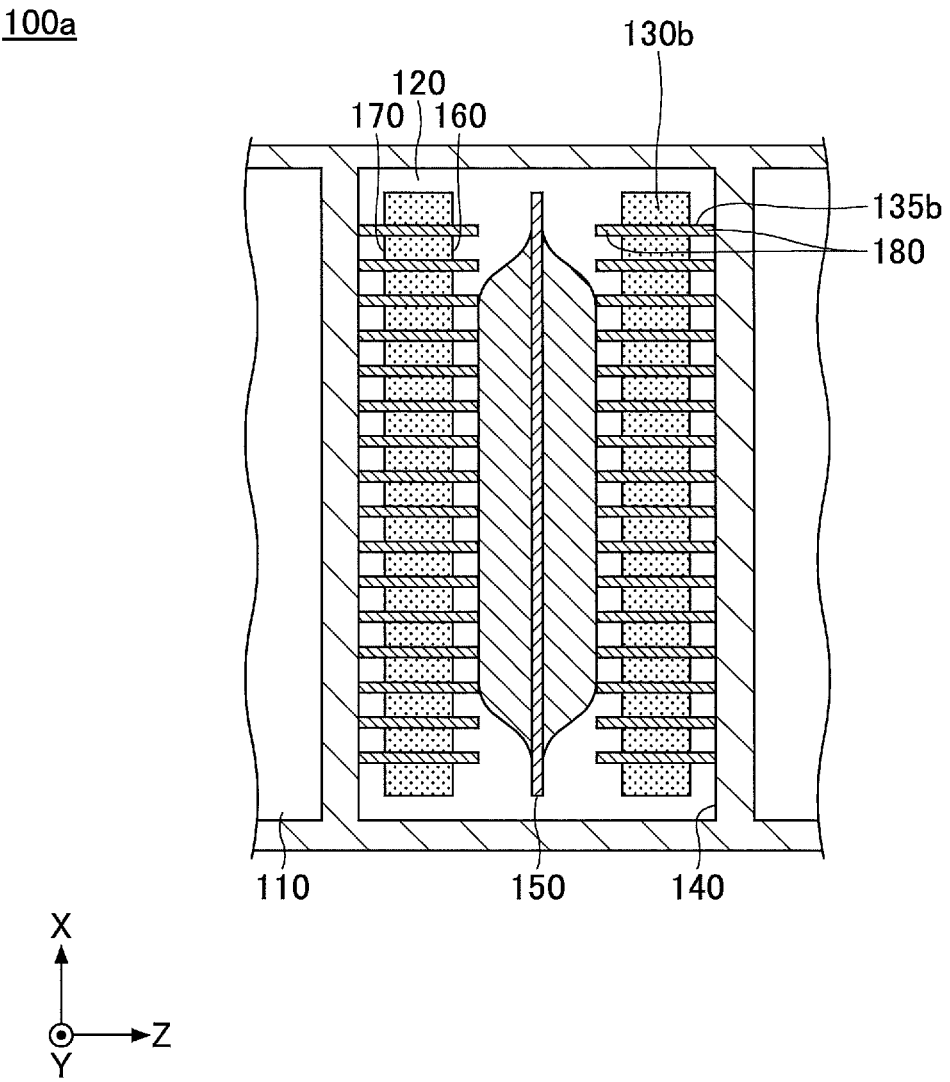
FIG. 15 is a schematic diagram for illustrating another form of arrangement of heat transfer enhancing members according to the embodiment.

Furthermore, as another variation of this embodiment, the heat transfer enhancing members 135b may be formed to project from each of the first and second surfaces 160 and 170 of the reaction material formed body 130b. FIG. 15 is a schematic diagram for illustrating another form of arrangement of heat transfer enhancing members according to this embodiment.

Causing the heat transfer enhancing members 135b to be formed to project from each of the first and second surfaces 160 and 170 of each reaction material formed body 130b as illustrated in FIG. 15 makes it also possible to reduce the thermal resistance between each reaction material formed body 130b and the reaction material pressing member 150, thus making is possible to further improve heat exchange performance. In this variation, the reaction medium flow passages 300 are also formed on a surface of each reaction material formed body 130b facing toward the reaction material pressing member 150 (that is, the first surface 160), so that the first surface 160 also may be used as a reaction surface for reaction with a reaction medium. Therefore, the rate of reaction of the reaction material formed bodies 130b further increase, so that it is possible to further increase the input and output speed of heat.

In this embodiment, the material of the heat transfer enhancing members 135b is not limited in particular as long as the material has good thermal conductivity as described above. It is preferable, however, that the heat transfer enhancing members 135b be formed of a material having toughness.

Figure 16:
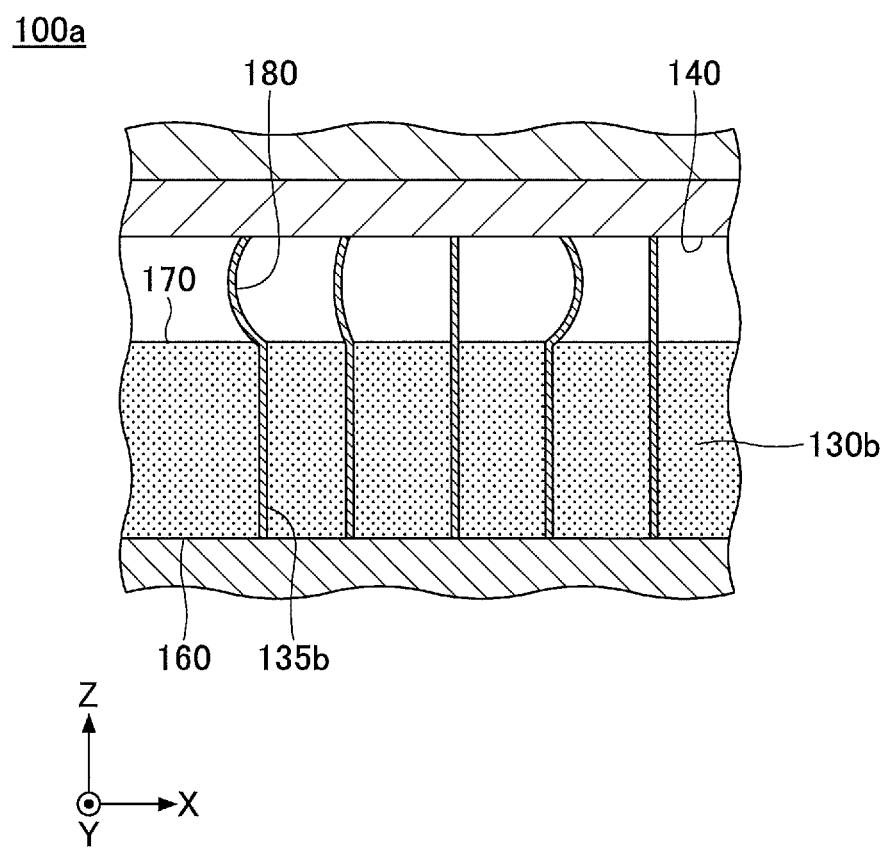
FIG. 16 is a schematic enlarged view of part of a heat storage and release unit around one of reaction material accommodating parts according to the embodiment.

FIG. 16 is a schematic enlarged view of part of the heat storage and release unit 100a around one of the reaction material accommodating parts 120 according to this embodiment.

As a result of forming the heat transfer enhancing members 135b of a material having toughness, the heat transfer enhancing members 135b may bend so that the projecting parts 180 of the heat transfer enhancing members 135b are equal in length in the Z direction even when the projecting lengths of the projecting parts 180 are not uniform as illustrated in FIG. 16. That is, variations in the lengths of the heat transfer enhancing members 135b are absorbed. This eliminates the necessity of finishing the projecting parts 180 with accurate dimensions, so that it is possible to manufacture the reaction material formed body 130b at reduced cost.

Of the above-described materials, metal materials such as copper and aluminum may be suitably used as materials having toughness.

As an example formation of the heat transfer enhancing members 135b having toughness, a description is given of the case of forming the heat transfer enhancing members 135b in a calcium sulfate reaction material formed body of 200 mm in width, 100 mm in length and 8 mm in thickness.

For example, copper wires of 10 mm in length and 0.3 mm in diameter are arranged with spaces in a calcium sulfate reaction material formed body of 200 mm in width, 100 mm in length and 8 mm in thickness so as to extend in the thickness direction of the reaction material formed body. The weight-based mixture ratio of the copper wires is 10 mass %. As a result, of the length of 10 mm of each copper wire, a length of 2 mm may be formed as the projecting part 180 (in the case where the copper wires are spaced in a direction perpendicular to the thickness direction).

Furthermore, as long as the heat transfer enhancing members 135b extend from the first surface 160 to the second surface 170, the heat transfer enhancing members 135b do not always have to extend in a direction parallel to the thickness direction of the reaction material formed body 130b.

Figure 17A:
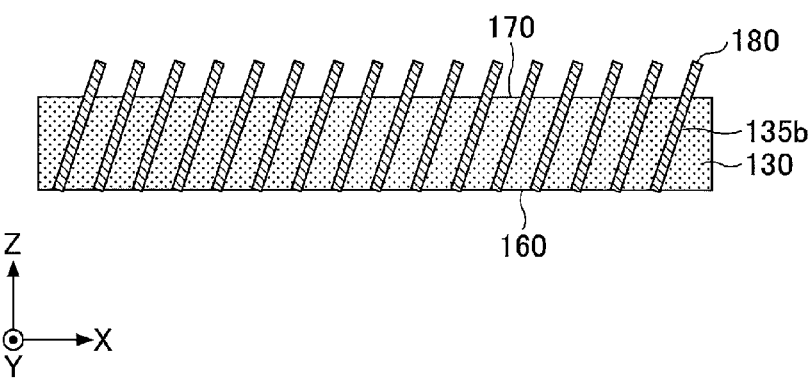
FIGS. 17A and 17B are schematic diagrams for illustrating other forms of arrangement of heat transfer enhancing members according to the embodiment.
Figure 17B:
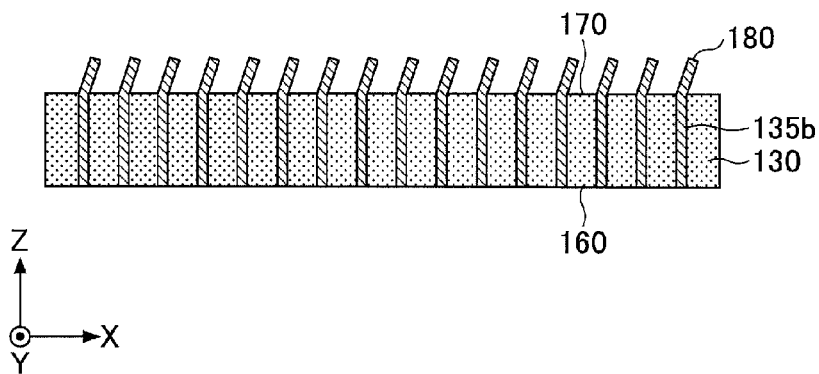
Figure 18:
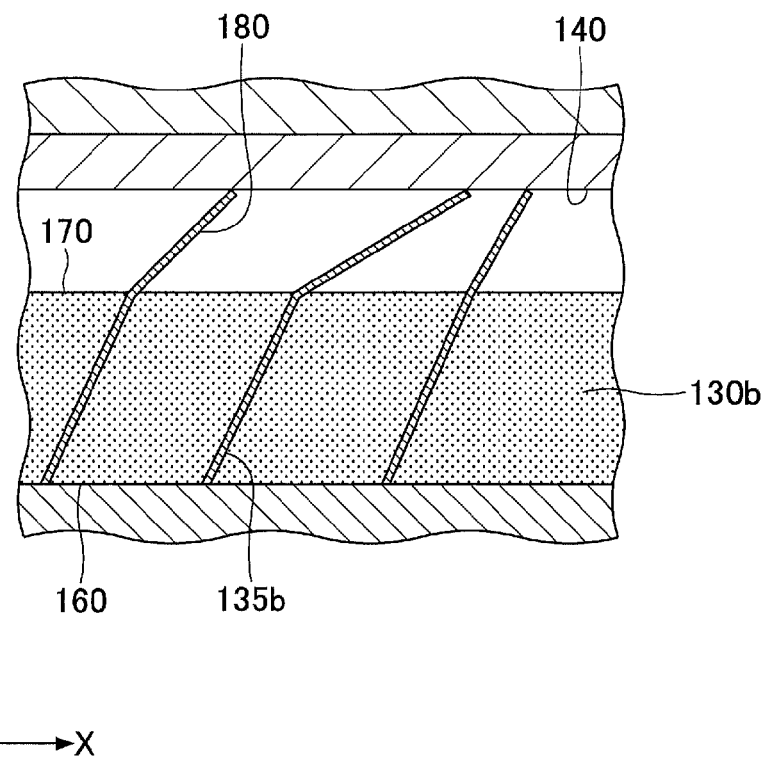
FIG. 18 is a schematic enlarged view of part of a heat storage and release unit around one of reaction material accommodating parts according to the embodiment.

FIGS. 17A and 17B are schematic diagrams for illustrating other forms of arrangement of heat transfer enhancing members according to this embodiment. FIG. 18 is a schematic enlarged view of part of the heat storage and release unit 100a around one of the reaction material accommodating parts 120 according to this embodiment.

To be more specific, FIG. 17A illustrates an embodiment where the heat transfer enhancing members 135b extend at a predetermined angle to the thickness direction of the reaction material formed body 130b (the Z direction). FIG. 17B illustrates an embodiment where the heat transfer enhancing members 135b change their direction of extension at some point along their length.

In the embodiments of the heat transfer enhancing members 135b illustrated in FIGS. 17A and 17B as well, it is possible to absorb variations in the lengths of the heat transfer enhancing members 135b as illustrated in FIG. 18 by using a material having toughness for the heat transfer enhancing members 135b. Therefore, there is no need to finish heat transfer enhancing members 135b with high dimensional accuracy, so that it is possible to obtain the reaction material formed body 130b having a high heat transfer characteristic at reduced cost. In the embodiments illustrated in FIGS. 17A and 17B, it is preferable to cause the projecting parts 180 to be oriented in the same direction relative to the thickness direction of the reaction material formed body 130b. If one or more of the projecting parts 180 are oriented in a different direction than the other projecting parts 180 relative to the thickness direction of the reaction material formed body 130b, some adjacent projecting parts 180 may interfere with each other.

Furthermore, the heat transfer enhancing members 135b may be formed of a flexible material such as a string-shaped material. As a result, regions of the heat transfer enhancing members 135b around their respective ends on the side on which the heat transfer enhancing members 135b come into contact with the corresponding heat transfer surface 140 may come into contact and exchange heat with the heat transfer surface 140. That is, the area of the regions around the contact-side ends of the heat transfer enhancing members 135b may be effectively used for heat transfer.

Flexible carbon fibers may be suitably used as a string-shaped material. As an example formation of the heat transfer enhancing members 135b of a string-shaped material, a description is given of the case of forming the heat transfer enhancing members 135b in a calcium sulfate reaction material formed body of 200 mm in width, 100 mm in length and 8 mm in thickness. For example, carbon fibers of 10 mm in length and 0.1 mm in diameter are arranged with spaces in a calcium sulfate reaction material formed body of 200 mm in width, 100 mm in length and 8 mm in thickness so as to extend in the thickness direction of the reaction material formed body 130. The weight-based mixture ratio of the carbon fibers is 2 mass %. As a result, of the length of 10 mm of each carbon fiber, a length of 2 mm may be formed as the projecting part 180 (in the case where the carbon fibers are spaced in a direction perpendicular to the thickness direction).

Furthermore, it is preferable that ends 190 (FIG. 19) of the heat transfer enhancing members 135b on the side on which the heat transfer enhancing members 135b come into contact with the corresponding heat transfer surface 140 be joined in advance to, for example, a plate-shaped heat transfer plate 200 (FIG. 19) whose principal surface is parallel to the heat transfer surface 140.

Figure 19:
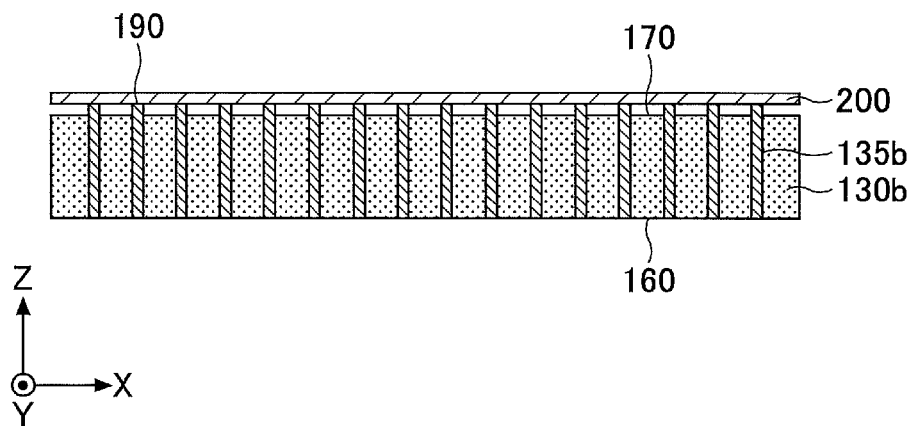
FIG. 19 is a schematic diagram illustrating another form of arrangement of heat transfer enhancing members according to the embodiment.

FIG. 19 is a schematic diagram illustrating another form of arrangement of heat transfer enhancing members according to this embodiment.

By providing the heat transfer plate 200 whose principal surface is parallel to the heat transfer surface 140, the heat transfer plate 200 and the heat transfer surface 140 are thermally coupled, so that it is possible to exchange heat more efficiently. The heat transfer plate 200 may employ the same material as the heat transfer enhancing members 235b.

Thus, in the above-described embodiment, the reaction material formed body 130b includes the heat transfer enhancing members 135b at least inside the reaction material formed body 130b. The heat transfer enhancing members 135b extend from the first surface 160 to the second surface 170 opposite to the first surface 160, and include the projecting parts 180 that project from at least one of the first and second surfaces 160 and 170. Use of such a reaction material formed body makes it possible to improve the efficiency of heat transfer between the reaction material formed body and a heat transfer surface of a heat storage and release unit. Furthermore, according to this embodiment, it is possible to form the reaction medium flow passages 300 between a heat transfer surface of a heat storage and release unit and a reaction material formed body, so that it is possible to increase the rate of reaction. Furthermore, a reaction material formed body according this embodiment has good thermal conductivity and therefore does not have to be fixedly adhered to a heat storage and release unit. Therefore, the reaction material formed body is easily replaceable in the case of degradation.

Figure 20:
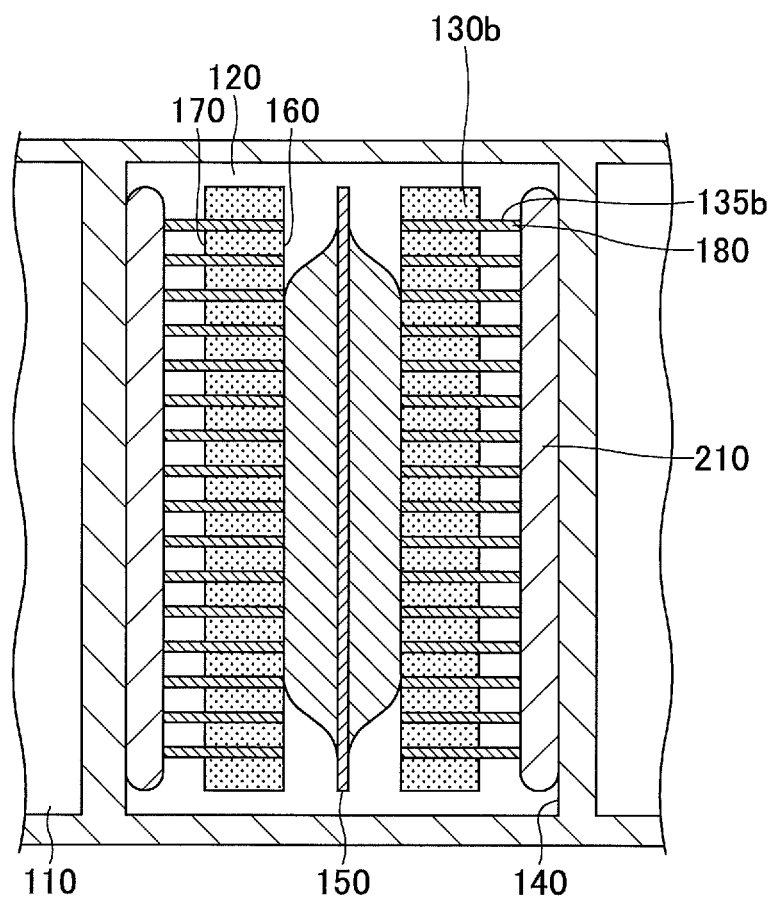
FIG. 20 is a schematic diagram for illustrating a form of arrangement of heat transfer enhancing members according to an embodiment of the present invention.

FIG. 20 is a schematic diagram for illustrating a form of arrangement of heat transfer enhancing members according to an embodiment of the present invention.

According to this embodiment, a deformable heat transfer member 210 that may be deformed by pressure is provided between the above-described reaction material formed body 130a or 130b and the corresponding heat transfer surface 140. By way of example, the reaction material formed bodies 130b are illustrated in FIG. 20.

Referring to FIG. 20, the deformable heat transfer member 210 is provided between each reaction material formed body 130b and the corresponding heat transfer surface 140. This makes it possible to further reduce the contact thermal resistance and accordingly to cause heat to be exchanged more efficiently between each reaction material formed body 130b and the corresponding heat transfer surface 140.

The material of the deformable heat transfer member 210 is, for example, a porous metal sheet of a metal such as nickel or a carbon fiber sheet.

For example, in the case of using the deformable heat transfer member 210, first, copper wires of 10 mm in length and 0.3 mm in diameter are arranged with spaces in a calcium sulfate reaction material formed body of 200 mm in width, 100 mm in length and 8 mm in thickness so as to extend in the thickness direction of the reaction material formed body. The weight-based mixture ratio of the copper wires is 10 mass %. As a result, of the length of 10 mm of each copper wire, a length of 2 mm may be formed as the projecting part 180 (in the case where the copper wires are spaced in a direction perpendicular to the thickness direction). Then, a carbon fiber sheet of, for example, 200 mm in width, 100 mm in length and 1 mm in thickness is placed between the projecting parts 180 and the heat transfer surface 140.

Thus, in this embodiment, the deformable heat transfer member 210 that may be deformed by pressure is provided between the reaction material formed body 130 (130a or 130b) and the corresponding heat transfer surface. As a result, it is possible to further reduce the contact thermal resistance and accordingly to cause heat to be exchanged more efficiently between the reaction material formed body 130 (130a or 130b) and the corresponding heat transfer surface 140.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A reaction material formed body into which a reaction material is formed, the reaction material reversibly reacting with a reaction medium to store or release heat, the reaction material formed body comprising:
   first and second opposite surfaces; and
   a plurality of heat transfer enhancing members extending at least from the first surface to the second surface,
   wherein at least two or more of the heat transfer enhancing members are oriented in a predetermined single direction, and
   wherein the heat transfer enhancing members include respective projecting parts projecting from at least one of the first surface and the second surface.

2. The reaction material formed body as claimed in claim 1, wherein the projecting parts of the heat transfer enhancing members are oriented in a same direction.

3. The reaction material formed body as claimed in claim 1, wherein all of the heat transfer enhancing members are oriented in the predetermined single direction.

4. The reaction material formed body as claimed in claim 1, wherein the heat transfer enhancing members have one of a needle shape, a string shape, and a thin strip shape.

5. The reaction material formed body as claimed in claim 1, wherein the heat transfer enhancing members are formed of a material having toughness.

6. The reaction material formed body as claimed in claim 1, wherein the heat transfer enhancing members are formed of a flexible string-shaped material.

7. The reaction material formed body as claimed in claim 1, wherein the heat transfer enhancing members include carbon fibers.

8. A heat storage and release unit, comprising:
   a reaction material formed body into which a reaction material is formed, the reaction material reversibly reacting with a reaction medium to store or release heat, the reaction material formed body including
   first and second opposite surfaces; and
   a plurality of heat transfer enhancing members extending at least from the first surface to the second surface,
   wherein at least two or more of the heat transfer enhancing members are oriented in a predetermined single direction;
   a reaction material accommodating part accommodating the reaction material formed body and including a heat transfer surface that exchanges heat with the reaction material formed body; and
   a reaction material pressing member configured to press the reaction material formed body against the heat transfer surface.

9. The heat storage and release unit as claimed in claim 8, further comprising:
   a deformable heat transfer member provided between the heat transfer surface and the reaction material formed body.

10. A heat storage and release unit, comprising:
    the reaction material formed body as set forth in claim 1;
    a reaction material accommodating part including a heat transfer surface that exchanges heat with the reaction material formed body and accommodating the reaction material formed body so that the projecting parts of the heat transfer enhancing members come into contact with the heat transfer surface; and
    a reaction material pressing member configured to press the projecting parts against the heat transfer surface.

11. The heat storage and release unit as claimed in claim 10, further comprising:
    a deformable heat transfer member provided between the heat transfer surface and the reaction material formed body.

12. A heat storage and release unit, comprising:
    a reaction material formed body into which a reaction material is formed, the reaction material reversibly reacting with a reaction medium to store or release heat, the reaction material formed body including
    first and second opposite surfaces; and
    a plurality of heat transfer enhancing members extending at least from the first surface to the second surface,
    wherein at least two or more of the heat transfer enhancing members are oriented in a predetermined single direction;
    a reaction material accommodating part accommodating the reaction material formed body and including a heat transfer surface that exchanges heat with the reaction material formed body; and
    a reaction material pressing member configured to press the reaction material formed body against the heat transfer surface,
    wherein a reaction medium flow passage for a reaction medium to flow through is formed on at least one of a contact surface of the reaction material formed body that comes into contact with the reaction material accommodating part and a contact surface of the reaction material formed body that comes into contact with the reaction material pressing member.

* * * * *